(12) United States Patent
Winiarski

(10) Patent No.: US 6,338,579 B1
(45) Date of Patent: Jan. 15, 2002

(54) FIBER OPTIC SLEEVE ASSEMBLY FOR USE AT A SPLICE JUNCTION OF A FIBER OPTIC CABLE

(76) Inventor: Robert F. Winiarski, 65 Brandon Run, Bristol, CT (US) 06010

( * ) Notice: Subject to any disclaimer, the term of this patent is extended or adjusted under 35 U.S.C. 154(b) by 0 days.

(21) Appl. No.: 09/497,237

(22) Filed: Feb. 3, 2000

(51) Int. Cl.$^7$ ............................................... G02B 6/255
(52) U.S. Cl. ............................ 385/99; 385/68; 385/95; 385/97; 385/98
(58) Field of Search .............................. 385/66, 68, 95, 385/96, 97, 98, 99, 100, 106, 109, 112

(56) References Cited

U.S. PATENT DOCUMENTS

| | | | |
|---|---|---|---|
| 4,537,468 A | * 8/1985 | Degoix et al. ............ 385/99 X |
| 4,580,874 A | * 4/1986 | Winter et al. ............. 385/99 X |
| 4,699,459 A | * 10/1987 | Priaroggia ................. 385/99 X |
| 4,810,277 A | * 3/1989 | Waitl et al. .................... 385/99 |
| 5,125,057 A | * 6/1992 | Aberson, Jr. et al. ......... 385/65 |
| 5,241,611 A | 8/1993 | Gould .......................... 385/70 |
| 5,341,448 A | * 8/1994 | Huebscher ................... 385/97 |
| 5,430,821 A | 7/1995 | Sasoka et al. ................ 385/99 |
| 5,436,999 A | 7/1995 | Brehm et al. ................. 385/95 |
| 5,515,473 A | * 5/1996 | Yamauchi et al. .......... 385/138 |
| 5,533,161 A | 7/1996 | Atkeisson et al. ............ 385/99 |
| 5,557,697 A | 9/1996 | Yoshie ........................ 385/99 |
| 5,592,579 A | 1/1997 | Cowen et al. ................ 385/99 |
| 5,642,451 A | 6/1997 | Kennedy et al. .............. 385/99 |
| 5,774,613 A | * 6/1998 | Tanabe et al. ................ 385/84 |
| 5,832,162 A | * 11/1998 | Sarbell ........................ 385/99 |
| 5,894,536 A | 4/1999 | Rifkin et al. ................. 385/99 |

* cited by examiner

*Primary Examiner*—Brian Healy

(57) ABSTRACT

A fiber protection sleeve assembly and method for installing the same in a splice junction of a fiber optic cable is provided. The fiber protection sleeve assembly is used in a splice junction in a fiber optic cable having a capillary tube with a capillary tube end and having an optical fiber arranged therein and extending therefrom, and includes a first tube and may also include a second tube and a third tube. The first tube is partially arranged in the capillary tube end for preventing contact between the optical fiber and the capillary tube end. The first tube may be a polymeric material, a thermoset or thermoplastic material, and an orange polyimide material about one inch long. The second tube frictionally engages the first tube for arranging the first tube in relation to the capillary tube end. The second tube may be a polymeric material, an elastomeric material, and a clear silicone tube about two inches long. The third tube is arranged and crimped to a carrier tube of the fiber optic cable to seal the optical fiber and abut the second tube against the capillary tube end. The third tube may be a polymeric material, an elastomeric material and an orange silicone tube about two inches long.

39 Claims, 4 Drawing Sheets

FIBER OPTIC SLEEVE ASSEMBLY FOR USE AT A SPLICE JUNCTION OF A FIBER OPTIC CABLE

BACKGROUND OF INVENTION

1. Technical Field

The present invention relates to a fiber optic cable; and more particularly to a fiber protection sleeve assembly for use in a splice junction of a fiber optic cable.

2. Description of Related Art

Over the years, fiber optic cables have gained popularity and are used in a variety of fields. One such field is oil and gas exploration where fiber optic systems, such as that shown in FIG. 1, are used for measuring various conditions underground, such as temperature, pressure, acceleration and vibration. A gas and/or oil exploration environment is harsh, characterized by well gases and fluids, extreme temperatures and pressures, and multiple other cables and equipment extending downwardly through a well into a deep underground region.

FIG. 1 shows one such system 10 for detecting the various conditions in an underground region 12 and transmitting data indicating the status of those conditions to the surface 14 that includes a fiber optic cable 16 having a surface end 20 and an underground end 22. The surface end 20 of the fiber optic cable 16 attaches to an instrumentation box 24 on the surface 14, while the underground end 22 extends into the underground region 12, passing through a well 26 and supporting one or more measuring devices 28. The fiber optic cable 16 has one or more optical fibers that are typically fragile and must be shielded from the harsh well environment. To effectively protect the optical fiber from the well environment, the optical fiber is placed into protective metal tubing and is environmentally sealed therein, like that shown in FIGS. 2 and 3.

FIGS. 2 and 3 show the fiber optic cable 16 which has optical fibers 32, 33 ultimately shielded by a protective outer capillary tube 34. Typically, the optical fibers 32, 33 are encased in a thin layer of flexible coating 35. The optical fibers 32, 33 are affixed to the inner capillary tube 37 using a pliable material 36, such as grease for example. A blocking polymer 38 is disposed between inner capillary tube 37 and outer capillary tube 34. The fiber optic cable 16 ensures that the optical fibers 32, 33 are protected from the harsh environment and from any mechanical loads imparted on the fiber optic cable 16. The subject matter of FIGS. 1, 2 and 3 is shown and described in more detail in a commonly-owned co-pending United States Patent Application, filed with Express Mail No. EL419975708US on Feb. 3, 2000 also hereby incorporated by reference in its entirety. Also see commonly-owned copending U.S. patent application Ser. No. 09/121,468, hereby incorporated by reference in its entirety, for a detailed description of another such optical fiber cable.

During installation and maintenance of the system 10 in FIG. 1, segments of the fiber optic cable 16 must be joined and sealed to form and maintain a continuous protective covering for the optical fibers 32, 33. For example, when the fiber optic cable 16 is either connected to another fiber optic cable, terminated on either end at a well head, a junction box or other instrument, or spliced and repaired for any other reason at some intermediate cable point, the metal inner and outer capillary tubes 34, 37 are cut and opened to gain access to the optical fibers 32, 33. After splicing the optical fibers 32, 33 to other optical fibers, ends of the metal inner and outer capillary tubes 34, 37 must be joined together or terminated at a splice junction.

By way of example, FIG. 4 shows a splice junction for a fiber optic cable 42 that is set forth in the commonly-owned co-pending United States Patent Application, filed with Express Mail No. EL419975708US on Feb. 3, 2000. In summary, the fiber optic cable and splice junction includes the optical fibers 32, 33, the outer capillary tube 34, a buffer material 36, the capillary tube 37, a blocking polymer 38, a splice protection assembly generally indicated as 40, slice couplings 46, 48, an outer tube 50, welds 52, 54, 56, 58, carrier tubes or heat sink tubes 60, 62, swage crimps 64, 66, swage crimps 80, 82, a splice protection 91, a splice area 144, and fiber splices 148, 150.

During installation and maintenance of the system 10 in FIG. 1, segments of the fiber optic cable 16 must also be cut and opened to gain access to the optical fibers 32, 33. There are known methods in the art of cutting and opening the metal inner and outer capillary tubes 34, 37 to gain access to the optical fibers 32, 33. In particular, the focus of this patent application is on the cutting and opening of the metal inner capillary tube 37, which is a metal tube about 2.4 millimeters in diameter. Typically, a knife file is used to provide a radial score on the metal inner capillary tube 37, which is then flexed until it breaks-off to expose the optical fibers 32, 33.

However, when the metal inner capillary tubes 34, 37 are cut and opened to gain access to the optical fibers 32, 33, then reassembled, problems arise due to the potential for cutting of the fiber jacket 35 caused by exposed edges of the capillary tube 37, when the spliced junction of the fiber optic cable 16 is subjected to vibration.

Because of this, various scoring, breaking and deburring tests were conducted by the inventor. In one test, visual inspections of the tube samples showed that a broken end of the metal inner capillary tube 37 was deformed with varying degrees of metal wings or tabs by the separation process. The deeper the score of the tube, the greater likelihood of a thin "tab or wing" of metal being produced. This "tab or wing" of metal may be bent either inwardly, outwardly or both. Any surface obstruction or restriction of the inner diameter of the broken end of the metal inner capillary tube 37 will pose a threat for fiber damage by abrasion over time. All samples exhibited this type of result to some extent.

In a second test, the samples were visually inspected after the deburring of the metal inner capillary tube 37. The inner diameter of the metal inner capillary tube 37 was opened by the deburring tool, but there was evidence of metal wings or tabs still present. A review of the separation process indicated that the metal inner capillary tube 37 had a tendency to rotate or twist with the deburring tool as it was being applied. This reduced the effectiveness of the deburring tool to remove the burrs, as did the rocking motion that is required to prevent possible fiber twist damage due to the tight inner diameter of the tool on the fiber. The combination of the twist, the required tightness of the inner diameter of the tool and the tool geometry (hex outer diameter surface) resulted in a poor end preparation of the inner tube 37, that could cause fiber damage.

In a third test, samples were visually inspected after the deburring of the metal inner capillary tube 37 held stationary. The inner diameter of the metal inner capillary tube 37 was opened and clear, but the deburring tool produced a counter bore on the inner diameter and flared the end of the outer diameter, i.e. the "tab or wings" were bent outward. This flare is a more favorable condition for the fiber interface; however, it does pose a problem with the splice procedure, because the copper heatsink centering washer will not pass over the flare.

These tests indicate that the aforementioned splicing procedure may present a reasonable risk of damage to the optical fibers 32, 33 in the spliced junction of the fiber optic cable 16. Failure of the transmission of optical signals on the optical fibers 32, 33 would be catastrophic to the performance of a signal transmission system like the system 10 shown in FIG. 1.

SUMMARY OF THE INVENTION

The present invention features a fiber protection sleeve assembly and method for installing the same in a splice junction of a fiber optic cable, which reduces any likelihood of damage to optical fibers in the fiber optic cable caused by vibration or shock after assembly.

The fiber protection sleeve assembly is for use in a fiber optic cable, including a splice junction, having a capillary tube with a capillary tube end and having an optical fiber arranged therein and extending therefrom, and includes at least a first tube, and may include a second tube and a third tube.

The first tube is partially arranged in the capillary tube end and has a bore for allowing the optical fiber to pass through and for preventing contact between the capillary tube end and the optical fiber. The first tube may be a polymeric material, a thermoset or thermoplastic material, and in one embodiment is an orange polyimide tube about one inch long. The material of the first tube should be rigid enough to be slipped inside the capillary tube end and compliant enough to protect the optical fiber. The first tube may be positioned and held in place either by tabs/burrs on the capillary tube end or by a secondary crimping operation.

In another embodiment, the second tube frictionally engages the first tube for arranging the first tube in relation to the capillary tube end and has a bore for allowing the optical fiber to pass through, for example, for splicing to another optical fiber. The second tube may be a polymeric material, an elastomeric material, and in one embodiment is a clear silicone tube about two inches long.

The fiber protection sleeve assembly may also include a third tube for arranging and crimping to a carrier tube of the fiber optic cable to abut the second tube against the capillary tube end and has a bore to allow the optical fiber to pass through, for example for splicing to another optical fiber. The third tube may be a polymeric material, an elastomeric material and in one embodiment is an orange silicone tube about one inch long.

Embodiments are also envisioned wherein the second tube is arranged and crimped in a carrier tube of the fiber optic cable to seal the optical fiber and abut the second tube against the capillary tube end, eliminating the need for the third tube.

The method for protecting the fiber optic cable includes the steps of: (1) inserting a first tube partially into a second tube to form a fiber protection sleeve assembly; (2) sliding the optical fiber through the fiber protection sleeve assembly; (3) inserting the first tube into the capillary tube with the fiber protection sleeve assembly contacting the capillary tube end; (4) installing a carrier tube over the fiber protector assembly and crimping the carrier tube on the capillary tube; (5) passing the optical fiber through a third tube; and (6) inserting the third tube into the carrier tube, and crimping the carrier tube on the third tube to seal the fiber and arrange the first tube in relation to the capillary tube end.

The invention also relates to a fiber optic cable having such a fiber protection sleeve assembly.

The fiber protection sleeve assembly and method of installing the same can be used when the fiber optic cable is either connected to another fiber optic cable (not shown), terminated on either end to a well head, a junction box or other instrument, or spliced and repaired for any other reason at some intermediate cable point, where the metal inner and outer capillary tubes are cut and opened to gain access to the optical fiber.

The foregoing and other objects, features and advantages of the present invention will become more apparent in light of the following detailed description of exemplary embodiments thereof, as illustrated in the accompanying drawing.

BRIEF DESCRIPTION OF THE DRAWING

The drawing includes numerous Figures, and the following is a brief description thereof.

DETAILED DESCRIPTION OF THE INVENTION

Figure 5:
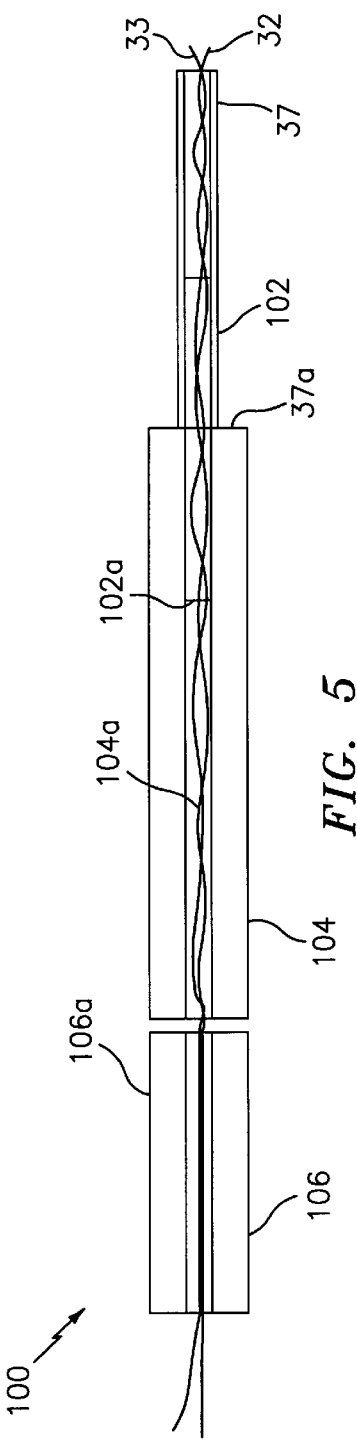
FIG. 5 is a diagram of a fiber protection sleeve assembly that is the subject matter of the present application.

FIG. 5: The Fiber Protection Sleeve Assembly

FIG. 5 shows a fiber protection sleeve assembly generally indicated as 100 that is the subject matter of the present invention. The fiber protection sleeve assembly 100 is used in a splice junction for a fiber optic cable, like cable 16 (FIGS. 1–4) which has an inner capillary tube 37 with a capillary tube end 37a and one or more optical fibers 32, 33 (FIGS. 1–4) arranged therein and extending therefrom. The fiber protection sleeve assembly 100 of the present invention is an enhancement to the design of the splice protector to that shown in FIG. 4, and the present invention is described in relationship to elements shown in FIG. 4. In FIG. 5, the fiber protection sleeve assembly 100 includes a first tube 102, and may also include a second tube 104 and a third tube 106.

Figure 1:
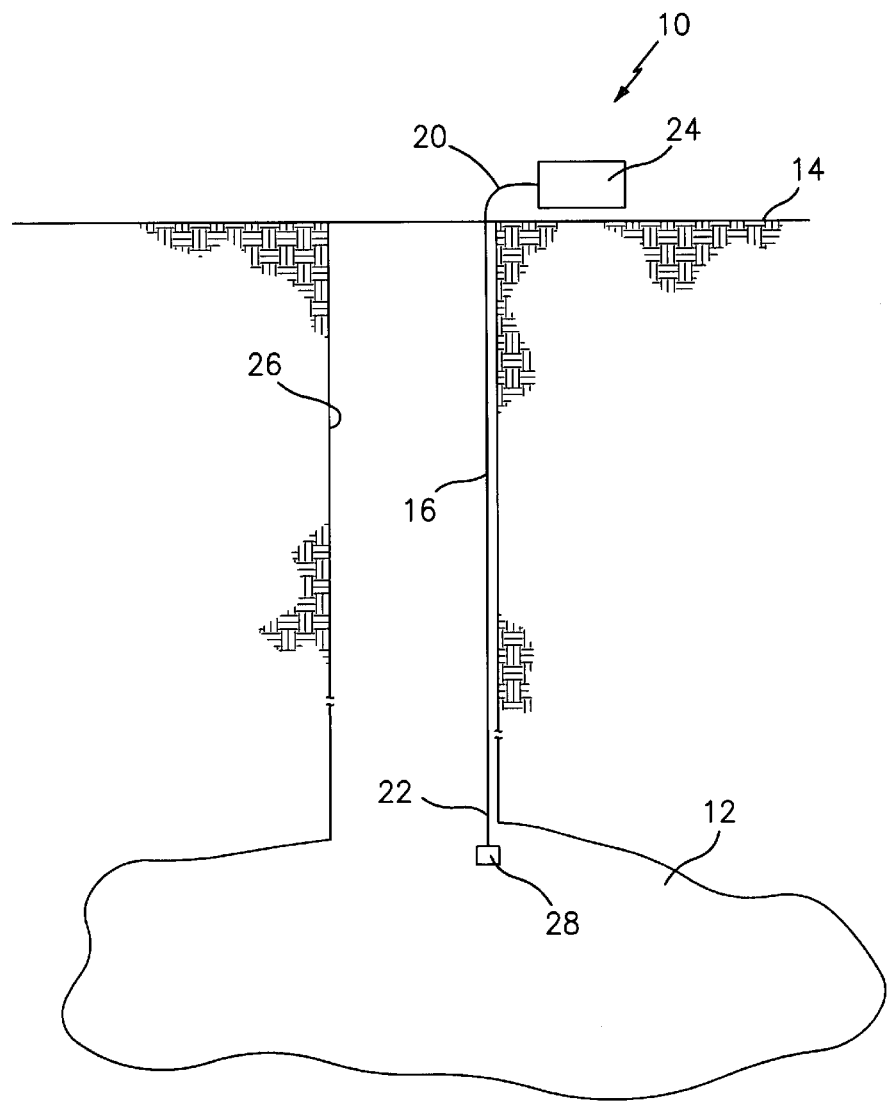
FIG. 1 is a schematic representation of a fiber optic cable extending through a well into an underground region.
Figure 2:
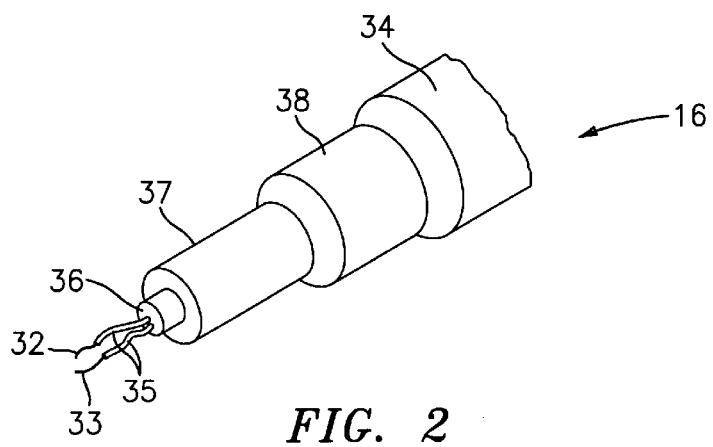
FIG. 2 is a cross sectional perspective representation of the fiber optic cable of FIG. 1.
Figure 3:
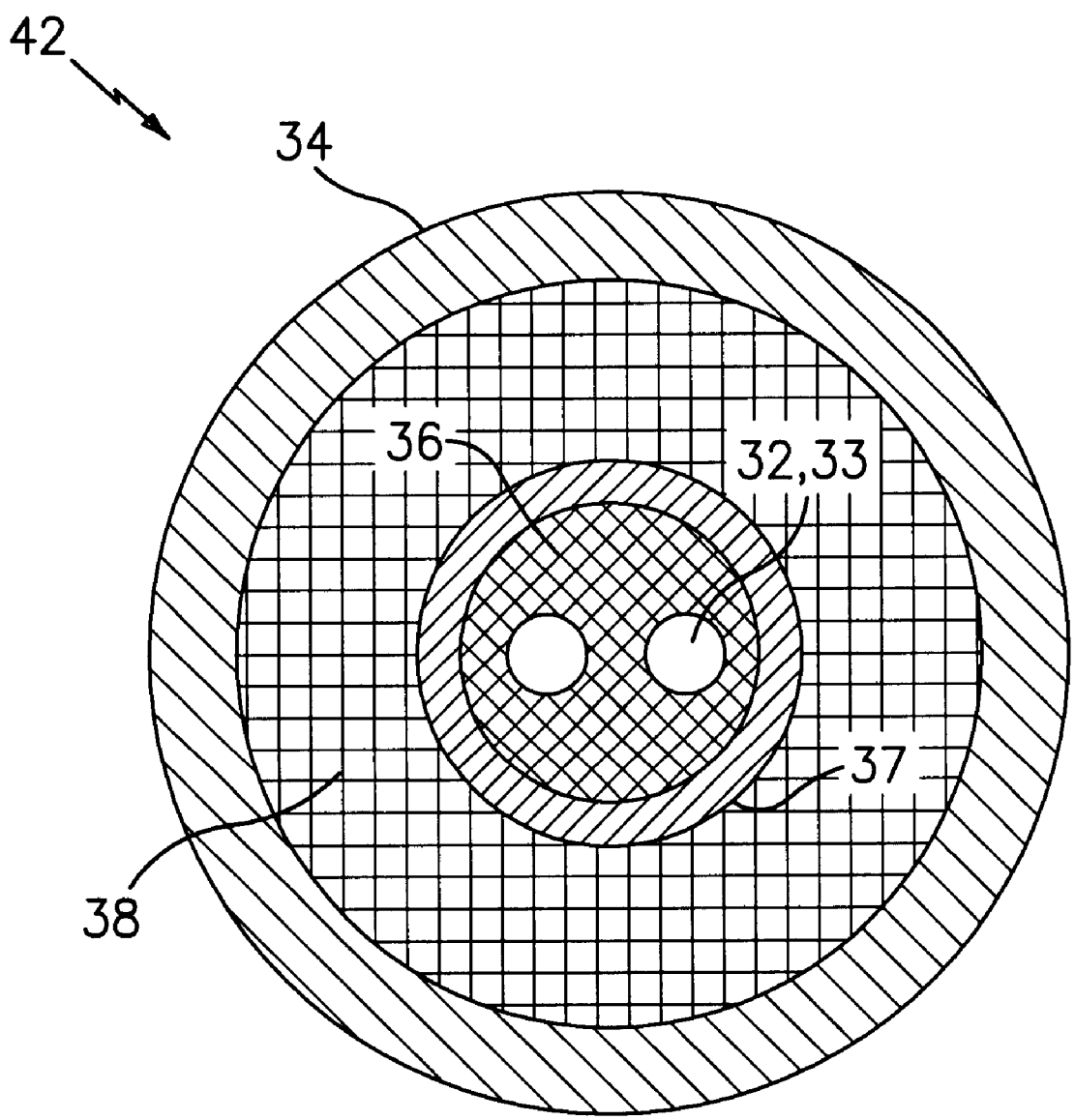
FIG. 3 is a cross sectional representation of the fiber optic cable of FIG. 2.
Figure 4:
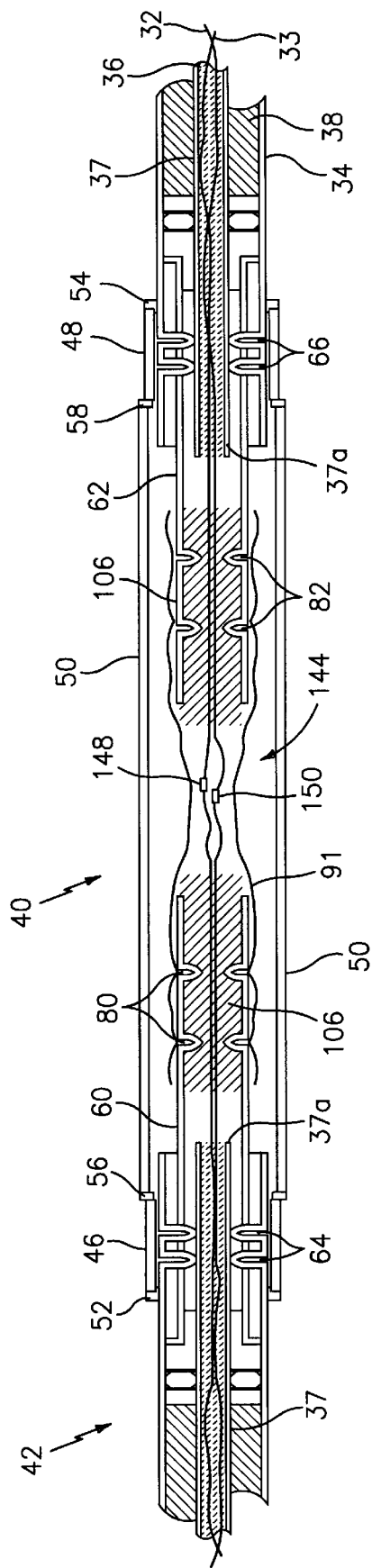
FIG. 4 is a side, cross sectional representation of the fiber optic cable of FIG.1.

The first tube 102 is partially and slidably arranged in the capillary tube end 37a and has a bore 102a for allowing the optical fibers 32, 33 (see FIG. 4) to pass through and for preventing contact between the capillary tube end 37a and the optical fibers 32, 33 (see FIG. 4). The first tube 102 may be made of a polymeric material, a thermoset or thermoplastic material, and as shown is an orange polyimide tube about one inch long. Structurally, the polyimide tube 102 must be rigid enough to slide into a bore of the capillary tube end 37a and compliant enough to protect the optical fiber 32, 33 (see FIG. 4). The polyimide tube 102 is manufactured by MicroLumen, Inc. as part no. 710-11, having dimensions including an outer diameter of about 0.075 inches and an inside diameter of about 0.71 inches. The scope of the invention is not intended to be limited to the size, dimension or type of rigid thermoplastic or thermoset material used for the first tube 102. The scope of the invention is intended to cover any material for the first tube that is rigid enough to be slipped inside the capillary tube end and compliant enough to protect the optical fiber, especially at elevated temperatures. The first tube 102 may be positioned and held in place either by tabs/burrs on the capillary tube end 37 or by a secondary crimping operation.

In another embodiment, the second tube 104 may be used that frictionally engages the first tube 102 for arranging the polyimide tube 102 in relation to the capillary tube end 37*a* and has a bore 104*a* for allowing the optical fibers 32, 33 (see FIG. 4) to pass through, for example for splicing to another optical fiber. The second tube 104 is a more flexible tube than the first tube 102 and must have an adhesive characteristic to frictionally engage the polyimide tube 102. The second tube 104 may be made of a polymeric material, an elastomeric material, and as shown is a clear silicone tube about two inches long. The clear silicone tube 104 functions to allow one to see how far the orange polyimide tube 102 is inserted therein. The clear silicone tube 104 is manufactured by Vesta Inc., having dimensions of an inner diameter of 0.070 inches and an outer diameter of 0.115 inches. The scope of the invention is not intended to be limited to the size, dimension or type of flexible and frictionally engaging elastomeric material used for the second tube 104.

In still another embodiment, the fiber protection sleeve assembly 100 may also include a third tube 106 for arranging and crimping to a carrier tube (see FIG. 4) of the fiber optic cable 16 (FIGS. 1–4) to abut the second tube 104 against the capillary tube end 37*a* and having a bore 106*a* for allowing the optical fibers 32, 33 (FIG. 4) to pass through, for example, for splicing to other optical fibers. The third tube 106 may be made of a polymeric material, an elastomeric material and as shown is an orange silicone tube about two inches long. The scope of the invention is not intended to be limited to the size, dimension or type of material used for the second tube 104.

Embodiments are also envisioned wherein the second tube 104 is arranged and crimped in a carrier tube (see FIG. 4) of the fiber optic cable 16 (FIGS. 1–4) to seal the optical fiber and abut the second tube against the capillary tube end 37*a*, in effect eliminating the need for the third tube 106. Another embodiment envisioned is a composite molded assembly in which the first and second tube attach as one using the aforementioned materials or a multi-density material.

The fiber protection sleeve assembly 100 reduces any likelihood of damage to optical fibers 32, 33 in the fiber optic cable caused by vibration or shock after splicing and reassembly.

FIG. 6

Figure 6:
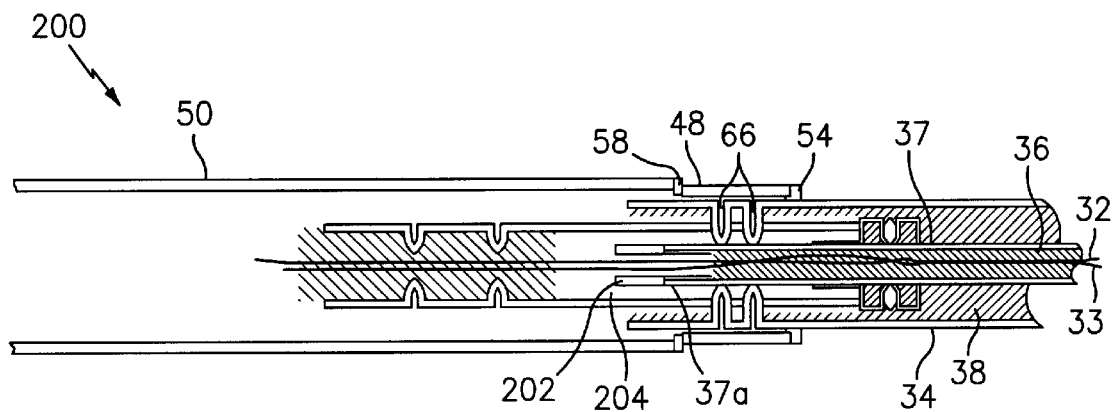
FIG. 6 is a partial view of a fiber optic cable 200 having a fiber protection sleeve assembly similar to that shown in FIG. 5.

FIG. 6 is a partial view of a fiber optic cable generally indicated as 200 having a fiber protection sleeve assembly similar to that shown in FIG. 5. Similar elements in FIGS. 1–5 are shown with similar reference numbers in FIG. 6.

The fiber optic cable 200 has a first tube 202 partially and slidably arranged in the capillary tube end 37*a* and has a bore for allowing the optical fibers 32, 33 to pass through and for preventing contact between the capillary tube end 37*a* and the optical fibers 32, 33. The fiber optic cable 200 has a second tube 204 that frictionally engages the first tube 202 for arranging the same in relation to the capillary tube end 37*a* and has a bore for allowing the optical fibers 32, 33 to pass through.

FIG. 7

Figure 7:
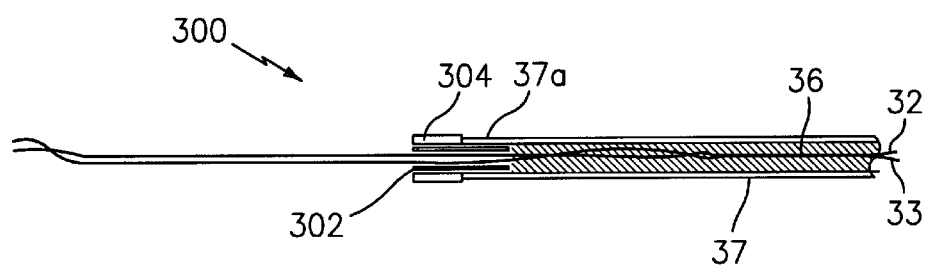
FIG. 7 is a partial view of a capillary tube 300 having a fiber protection sleeve assembly similar to that shown in FIG. 5.

FIG. 7 is a partial view of a capillary tube assembly generally indicated as 300 having a fiber protection sleeve assembly similar to that shown in FIG. 5. Similar elements in FIGS. 1–5 are shown with similar reference numbers in FIG. 7.

The capillary tube assembly 300 has a first tube 302 partially and slidably arranged in the capillary tube end 37*a* and has a bore for allowing the optical fibers 32, 33 to pass through and for preventing contact between the capillary tube end 37*a* and the optical fibers 32, 33. The capillary tube assembly 300 has a second tube 304 that frictionally engages the first tube 302 for arranging the same in relation to the capillary tube end 37*a* and has a bore for allowing the optical fibers 32, 33 to pass through.

FIG. 8

Figure 8:
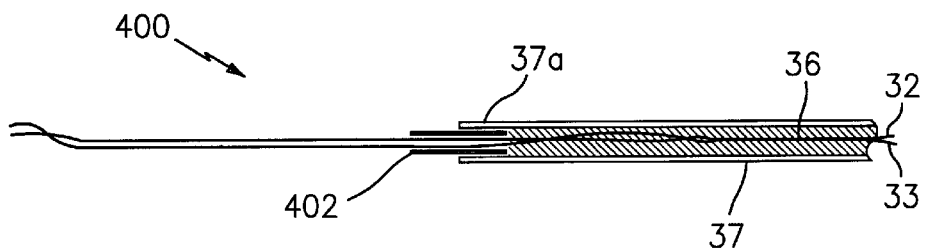
FIG. 8 is a partial view of a capillary tube 300 having a fiber protection sleeve assembly similar to that shown in FIG. 5.

FIG. 8 is a partial view of a capillary tube assembly generally indicated as 400 having a fiber protection sleeve assembly similar to that shown in FIG. 5.

The capillary tube assembly 400 has a first tube 402 partially and slidably arranged in the capillary tube end 37*a* and has a bore for allowing the optical fibers 32, 33 to pass through and for preventing contact between the capillary tube end 37*a* and the optical fibers 32, 33. The first tube 402 is positioned and held in place either by tabs/burrs on the capillary tube end 37*a* or by a secondary crimping operation (similar to 80, 82 in FIG. 4) that crimps the capillary tube 37 to the first tube 402.

The Method

The present invention also provides a method for protecting optical fiber of the fiber optic cable 16 that includes the steps of: (1) inserting the orange polyimide tube 102 approximately 0.500 inches into the clear silicone tube 104 to form the fiber protection sleeve assembly 100; (2) sliding the optical fibers 32, 33 (FIG. 4) through the bores 102*a*, 104*a* of the fiber protection sleeve assembly 100; (3) inserting the orange polyimide tube 102 into the capillary tube 37 with the fiber protection sleeve assembly 100 contacting the capillary tube end 37*a*; (4) installing a carrier tube 60, 62 over the fiber protector assembly 100 and crimping the carrier tube 60, 62 on the capillary tube 37; (5) passing the optical fiber 32, 33 (FIG. 4) through a bore 106*a* of the orange silicone tube 106; and (6) inserting the orange silicone tube 106 into the carrier tube 60, 62, and crimping the carrier tube 60, 62 onto the third tube 106 to arrange the polyimide tube 102 in relation to the capillary tube end 37*a*.

The fiber protection sleeve assembly 100 and method of installing the same can be used when the fiber optic cable 16 is either connected to another fiber optic cable (not shown), terminated on either end to a well head (not show), a junction box (not shown) or other instrument, or spliced and repaired for any other reason at some intermediate cable point, where the metal inner and outer capillary tube are cut and opened to gain access to the optical fiber. When used at a single termination end, an inner cap tube is cut and the fiber optic cable is not subsequently welded.

Scope of the Invention

Although the invention has been described and illustrated with respect to exemplary embodiments thereof, the foregoing and various other additions and omissions may be made therein and thereto without departing from the spirit and scope of the present invention.

I claim:

1. A fiber protection sleeve assembly for use in a fiber optic cable having a capillary tube with a capillary tube end and having an optical fiber, the fiber protection sleeve assembly comprising:
   a first tube partially arranged in the capillary tube end and having a bore for allowing the optical fiber to pass through and preventing contact between the capillary tube end and the optical fiber.

2. A fiber protection sleeve assembly according to claim 1, wherein the first tube is positioned and held in place by tabs/burrs on the capillary tube end.

3. A fiber protection sleeve assembly according to claim 1, wherein the first tube is positioned and held in place by a secondary crimping operation.

4. A fiber protection sleeve assembly according to claim 1, wherein the first tube is a polymeric material.

5. A fiber protection sleeve assembly according to claim 1, wherein the first tube is a thermoset or thermoplastic material.

6. A fiber protection sleeve assembly according to claim 1, wherein the first tube is a polyimide material.

7. A fiber protection sleeve assembly according to claim 1, wherein the first tube is a colored polyimide tube about one inch long.

8. A fiber protection sleeve assembly according to claim 1, wherein the fiber protection sleeve assembly further comprises a second tube frictionally engaging the first tube for arranging the first tube in relation to the capillary tube end and having a bore for allowing the optical fiber to pass through.

9. A fiber protection sleeve assembly according to claim 8, wherein the second tube is a polymeric material.

10. A fiber protection sleeve assembly according to claim 8, wherein the second tube is an elastomeric material.

11. A fiber protection sleeve assembly according to claim 8, wherein the second tube is a silicone material.

12. A fiber protection sleeve assembly according to claim 8, wherein the second tube is a silicone tube about two inches long.

13. A fiber protection sleeve assembly according to claim 8, wherein the second tube is arranged and crimped in a carrier tube of the fiber optic cable to abut the second tube against the capillary tube end.

14. A fiber protection sleeve assembly according to claim 8, wherein the fiber protection sleeve assembly includes a third tube for arranging and crimping to a carrier tube of the fiber optic cable to abut the second tube against the capillary tube end and having a bore for allowing the optical fiber to pass through.

15. A fiber protection sleeve assembly according to claim 14, wherein the third tube is a polymeric material.

16. A fiber protection sleeve assembly according to claim 14, wherein the third tube is an elastomeric material.

17. A fiber protection sleeve assembly according to claim 14, wherein the third tube is a silicone material.

18. A fiber protection sleeve assembly according to claim 14, wherein the third tube is a colored silicone tube about one inch long.

19. A junction for a fiber optic cable having a capillary tube with a capillary tube end and having an optical fiber arranged therein and extending therefrom, the junction comprising:
   a first tube partially arranged in the capillary tube end and having a bore for allowing the optical fiber to pass through and preventing contact between the capillary tube end and the optical fiber.

20. A junction according to claim 19, wherein the first tube is positioned and held in place by tabs/burrs on the capillary tube end.

21. A junction according to claim 19, wherein the first tube is positioned and held in place by a secondary crimping operation.

22. A junction according to claim 19, wherein the first tube is a polyimide tube.

23. A junction according to claim 19, wherein the junction comprises:
   a second tube fitting over and engaging the first tube and arranging the first tube in relation to the capillary tube end and having a bore for allowing the optical fiber to pass through.

24. A junction according to claim 23, wherein the second tube is a silicone tube.

25. A junction according to claim 23, wherein the junction comprises:
   a carrier tube crimped to the capillary tube; and
   a third tube arranged and crimped in the carrier tube to abut the second tube against the capillary tube end and having a bore for allowing the optical fiber to pass through.

26. A junction according to claim 23, wherein the third tube is a silicone tube.

27. A fiber optic cable having a capillary tube with a capillary tube end and having an optical fiber arranged therein and extending therefrom, comprising:
   a first tube partially arranged in the capillary tube end and having a bore for allowing the optical fiber to pass through and prevent contact between the capillary tube end and the optical fiber.

28. A fiber optic cable according to claim 27, wherein the first tube is positioned and held in place by tabs/burrs on the capillary tube end.

29. A fiber optic cable according to claim 27, wherein the first tube is positioned and held in place by a secondary crimping operation.

30. A fiber optic cable according to claim 27, wherein the first tube is a polyimide tube.

31. A fiber optic cable according to claim 27, wherein the fiber optic cable further comprises:
   a second tube fitting over and engaging the first tube and arranging the first tube in relation to the capillary tube end, and having a bore for allowing the optical fiber to pass through.

32. A fiber optic cable according to claim 31, wherein the second tube is a silicone tube.

33. A fiber optic cable according to claim 31, wherein the fiber optic cable further comprises:
   a carrier tube crimped to the capillary tube; and
   a third tube arranged and crimped in the carrier tube to abut the second tube against the capillary tube end and having a bore for allowing the optical fiber to pass through for splicing to another optical fiber.

34. A fiber optic cable according to claim 31, wherein the third tube is a silicone tube.

35. A method for protecting optical fibers of a fiber optic cable having a capillary tube with a capillary tube end and having an optical fiber arranged therein and extending therefrom, comprising the steps of:
   inserting a first tube partially into a second tube to form a fiber protection sleeve assembly;
   sliding the optical fiber through the fiber protection sleeve assembly;

inserting the first tube into the capillary tube with the fiber protection sleeve assembly contacting the capillary tube end;

installing a carrier tube over the fiber protector assembly and crimping the carrier tube or the carrier tube on the capillary tube;

passing the optical fiber through a third tube; and inserting the third tube into the carrier tube, and crimping the carrier tube on the third tube to seal the fiber and arrange the first tube in relation to the capillary tube end.

36. A method according to claim 35, wherein the first tube is a polyimide tube.

37. A method according to claim 35, wherein the second tube is a silicone tube.

38. A method according to claim 35, wherein the third tube is a silicone tube.

39. A method according to claim 35, wherein the second tube abuts against the capillary tube end.

* * * * *